United States Patent
Brooks

(10) Patent No.: US 9,828,679 B1
(45) Date of Patent: Nov. 28, 2017

(54) APPARATUS AND PROCESS FOR REMOVING SUPPORT STRUCTURE FROM A 3D PRINTED PART

(71) Applicant: Stephen M Brooks, Jupiter, FL (US)

(72) Inventor: Stephen M Brooks, Jupiter, FL (US)

(73) Assignee: Florida Turbine Technologies, Inc., Jupiter, FL (US)

( * ) Notice: Subject to any disclaimer, the term of this patent is extended or adjusted under 35 U.S.C. 154(b) by 0 days.

(21) Appl. No.: 15/190,229

(22) Filed: Jun. 23, 2016

(51) Int. Cl.
| | |
|---|---|
| *C23F 1/16* | (2006.01) |
| *B33Y 10/00* | (2015.01) |
| *B33Y 30/00* | (2015.01) |
| *B33Y 80/00* | (2015.01) |
| *B23K 26/32* | (2014.01) |
| *H05B 6/40* | (2006.01) |
| *H05B 6/10* | (2006.01) |
| *B33Y 40/00* | (2015.01) |
| *B05C 11/10* | (2006.01) |
| *B29C 67/00* | (2017.01) |

(52) U.S. Cl.
CPC ............ *C23F 1/16* (2013.01); *B05C 11/1002* (2013.01); *B23K 26/32* (2013.01); *B29C 67/0096* (2013.01); *B33Y 10/00* (2014.12); *B33Y 30/00* (2014.12); *B33Y 40/00* (2014.12); *B33Y 80/00* (2014.12); *H05B 6/10* (2013.01); *H05B 6/40* (2013.01)

(58) Field of Classification Search
None
See application file for complete search history.

(56) References Cited

U.S. PATENT DOCUMENTS

| | | | |
|---|---|---|---|
| 2013/0075957 A1* | 3/2013 | Swanson | B08B 3/104 264/405 |
| 2015/0197862 A1* | 7/2015 | Engel | |

\* cited by examiner

*Primary Examiner* — Jiong-Ping Lu
(74) *Attorney, Agent, or Firm* — John Ryznic

(57) ABSTRACT

An apparatus and a process for removing a support structure from a 3D printed part, where the 3D printed part along with the support structure is placed in an acid solution and the part is surrounded by an induction heater. The acid solution is recirculated through the acid tank to prevent the acid solution from heating up too much. Small surfaces of the part are heated up by the induction heater before larger pieces are heated so that the acid will remove the smaller pieces first. After enough time, all of the support structure is removed by the acid and the heater to leave the finished 3D printed part with the support structure removed.

1 Claim, 2 Drawing Sheets

APPARATUS AND PROCESS FOR REMOVING SUPPORT STRUCTURE FROM A 3D PRINTED PART

GOVERNMENT LICENSE RIGHTS

This invention was made with Government support under contract number W911NF-15-P-0063 awarded by DARPA. The Government has certain rights in the invention.

CROSS-REFERENCE TO RELATED APPLICATIONS

None.

BACKGROUND OF THE INVENTION

Field of the Invention

The present invention relates generally to An apparatus and a process for producing a 3D printed part such as by metal additive manufacturing, and more specifically to an apparatus and a process for removing a support structure from a 3D printed part.

Description of the Related Art Including Information Disclosed Under 37 CFR 1.97 and 1.98

The metal additive manufacturing process (MAM) is a 3D printing process in which a metallic part is printed by progressively depositing thin layers of a metallic powder on a bed and using a laser to solidify certain areas of the metallic powder. As the part builds in an upward direction, a support structure is required for areas such as an overhang where the metallic powder must be supported until the laser can solidified that area. The support structure is typically formed using the same metallic powder but in a less dense structure such as a honeycomb structure.

Once the part has been formed, this support structure must be removed. The support structure can be removed using a mechanical process of physically breaking the support structure free from the part. However, this requires access to the support structure within the part. For a complex part with hidden internal structure, a mechanical means such as a tool cannot be used to reach within the internal sections of the part where the support structure is located. An example of a complex part could be an air cooled turbine airfoil with internal cooling passages and features such as trip strips or pedestals.

BRIEF SUMMARY OF THE INVENTION

An apparatus and a process for removing a support structure from a 3D printed part, where the 3D printed part along with the support structure is placed in an acid solution and the part is surrounded by an induction heater. The acid solution is recirculated through the acid tank to prevent the acid solution from heating up too much. Small surfaces of the part are heated up by the induction heater before larger pieces are heated so that the acid will remove the smaller pieces first. After enough time, all of the support structure is removed by the acid and the heater to leave the finished 3D printed part with the support structure removed.

The 3D printed part can be a turbopump with a single piece rotor within a single piece housing, and the acid solution can be cooled or diluted hydrochloric acid, and the tank and pipe and pump can be of a ceramic coated copper. The acid tank can be made from a plastic or glass material that does not react with the acid solution.

DETAILED DESCRIPTION OF THE INVENTION

The present invention is an apparatus and a process for removing a support structure from a 3D printed part such as a metallic part formed using a metal additive manufacturing (MAM) process. A metallic part such as an air cooled turbine airfoil used in a gas turbine engine can be formed from layers of a metallic powder deposited onto a bed and solidified using a laser to melt the metallic powder in certain areas. Some of the metallic powder deposited can be used as a support surface for parts that are overhung. The support structure is formed with less density than the solidified metallic areas in order that it can be removed after the part has been formed. In areas that are too difficult to reach using a mechanical tool to remove the support structure, the apparatus and process of the present invention can be used.

The 3D printed part with support structure is placed in an acid bath and the part is heated using an induction coil so that small surfaces of the part are heated first, thus increasing the reaction with the acid and removing the support structure material faster than the lower temperature material. The acid solution is pumped through the acid tank to ensure bulk temperature does not heat up too much. Over time all of the small areas will be removed and the support structure will have been etched away, leaving the finished part without any support structure therein.

Figure 1:
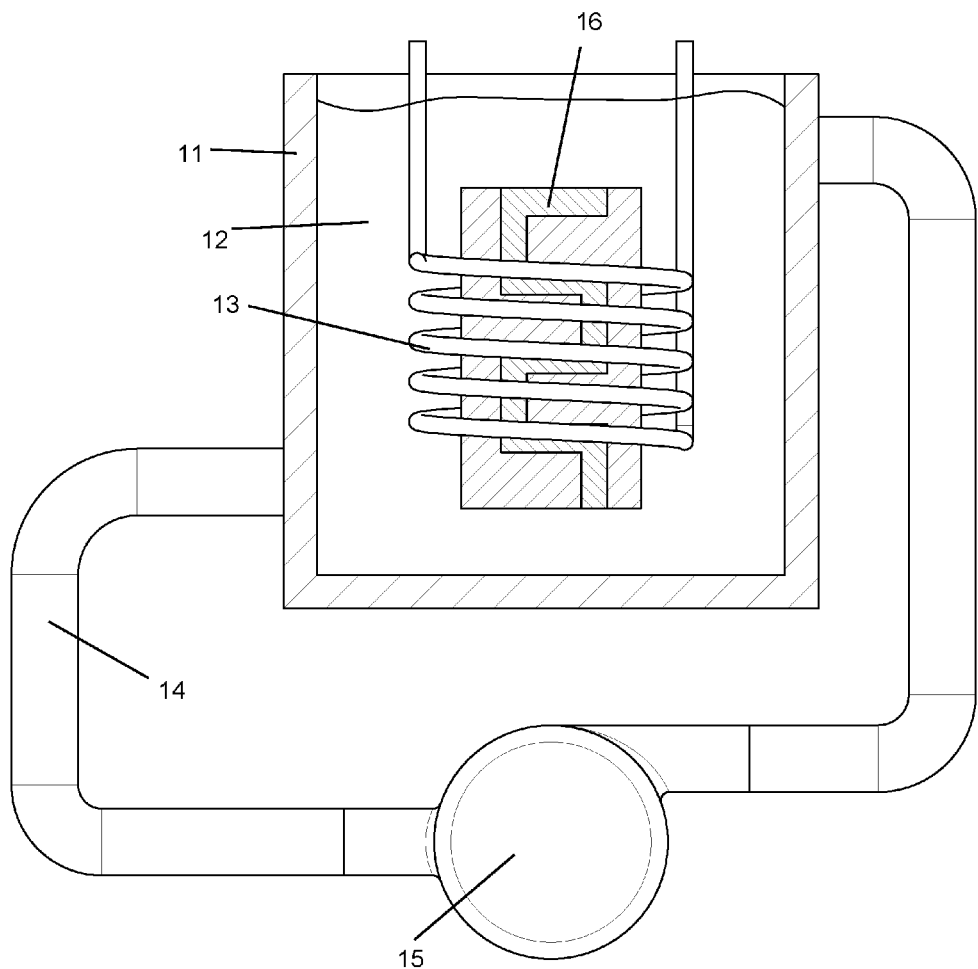
FIG. 1 shows a cross section side view of an apparatus for removing support structure from a 3D printed part according to the present invention.

The apparatus for removing the support structure from a 3D printed part is shown in FIG. 1 and includes a acid solution tank 11, an acid solution 12, a 3D printed part with support structure therein 16, an induction coil heater, an acid solution pump 15, and an acid solution recirculation pipe 14. The acid solution is a cooled or diluted acid solution so that a slow reaction with the less dense support structure occurs. The acid solution 12 is recirculated within the tank 11 and around the part 16 to limit the acid solution from heating up too much. The 3D printed part can be an air cooled turbine airfoil made from a nickel superalloy, the acid solution could be hydrochloric acid, the acid tank could be formed from a plastic material or glass material, and the acid tank and the pipe and the pump could be ceramic coated copper to prevent the acid from effecting anything other than the support structure of the part 16.

Figure 2:
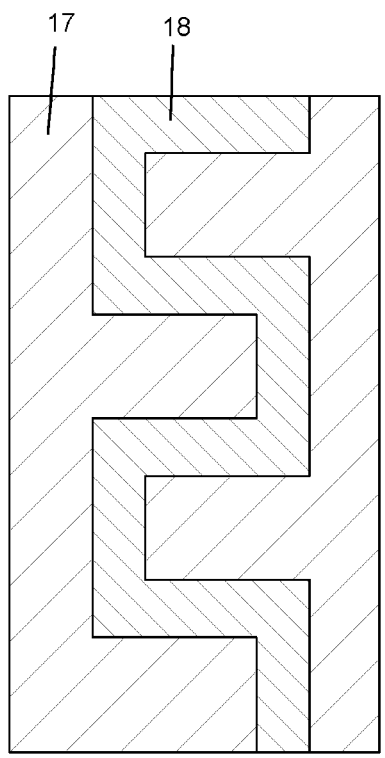
FIG. 2 shows a cross section side view of a 3D printed part with support structure intact.
Figure 3:
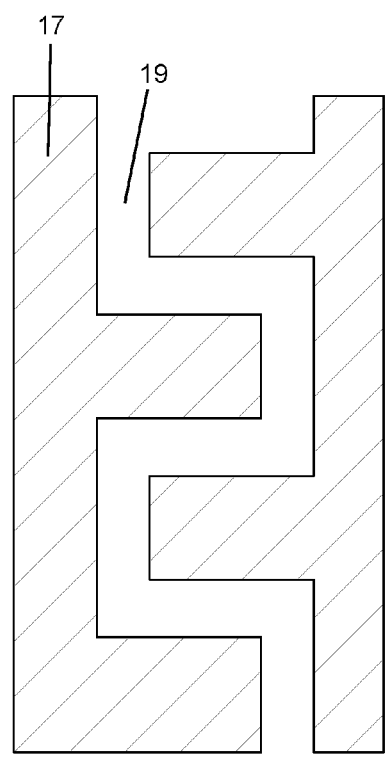
FIG. 3 shows a cross section side view of the 3D printed part of FIG. 2 with the support structure removed according to the present invention.

The 3D printed part with the support structure is shown in FIG. 2 with the metal part 17 and the support structure 18 having several overhung sections. The 3D part with the support structure intact is placed within the acid solution 12 and the induction heater coil 13 is moved to surround the part 16. The acid solution is circulated through the tank 11 so that bulk temperature of the acid 12 does not change much. The induction heater will then heat up small surfaces of the part before the larger surfaces heat up so that the acid reacts to the smaller and heated surfaces and remove the smaller surfaces first. This process continues until all of the support structure is removed or as much as possible can be removed. FIG. 3 shows the 3D printed part 17 with the support solution removed.

The apparatus and process for removing support structure from a 3D printed part can be used for metallic parts such as turbomachinery airfoils or shrouded airfoils, and even plastic parts. One such turbomachinery could be a turbopump with a single piece rotor within a single piece housing in which the single piece rotor is trapped within the single piece housing. The turbopump would be printed in a vertical direction along an axis of the rotor and the housing in which the support structure is printed along with the rotor and housing, and then the entire assembly is placed in the acid solution and the support structure removed using the induction heater and the acid solution.

I claim the following:

1. A process for removing a support structure from a 3D part formed using an additive manufacturing process comprising the steps of:
   forming the 3D part using an additive manufacturing process in which a support structure is also formed;
   placing the 3D part with the support structure in an acid solution;
   heating the 3D part with the support structure within the acid solution using an induction coil submerged within the acid solution such that the support structure is removed by the acid solution; and,
   recirculating the acid solution while the 3d part is being heated to limit a temperature rise of the acid solution.

* * * * *